(12) United States Patent
Chu

(10) Patent No.: US 11,347,199 B2
(45) Date of Patent: May 31, 2022

(54) PROGRAM EDITING DEVICE, WIRE ELECTRICAL DISCHARGE MACHINE AND PROGRAM EDITING METHOD

(71) Applicant: FANUC CORPORATION, Minamitsuru-gun (JP)

(72) Inventor: Fuchen Chu, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/085,446

(22) Filed: Oct. 30, 2020

(65) Prior Publication Data

US 2021/0141360 A1    May 13, 2021

(30) Foreign Application Priority Data

Nov. 8, 2019   (JP) .............................. JP2019-203211
Mar. 30, 2020  (JP) .............................. JP2020-060204

(51) Int. Cl.
| G05B 19/4068 | (2006.01) |
| G05B 19/404 | (2006.01) |
| G05B 19/408 | (2006.01) |
| G05B 19/25 | (2006.01) |

(52) U.S. Cl.
CPC ......... G05B 19/4068 (2013.01); G05B 19/25 (2013.01); G05B 19/404 (2013.01); G05B 19/4086 (2013.01)

(58) Field of Classification Search
None
See application file for complete search history.

(56) References Cited

U.S. PATENT DOCUMENTS

| 4,518,842 | A | 5/1985 | Obara |
| 4,891,763 | A * | 1/1990 | Kuriyama ........ G05B 19/40931 |
| | | | 700/183 |
| 5,504,294 | A | 4/1996 | Izumiya et al. |
| 2005/0107921 | A1 | 5/2005 | Watanabe et al. |
| 2015/0212515 | A1 | 7/2015 | Kato et al. |
| 2016/0011583 | A1 | 1/2016 | Matsubara et al. |
| 2017/0371316 | A1* | 12/2017 | Kimura ............. G05B 19/4097 |

FOREIGN PATENT DOCUMENTS

| EP | 2 913 134 A1 | 9/2015 |
| EP | 3 104 238 A1 | 12/2016 |
| JP | H05-228736 A | 9/1993 |
| JP | 2005-149016 A | 6/2005 |
| JP | 2014-029605 A | 2/2014 |

OTHER PUBLICATIONS

Friendess Inc., "CypCut Laser Cutting Control System-User Manual" (XP055788553), Jan. 15, 2016.
Extended European Search Report dated Apr. 1, 2021 for European Patent Application No. 20204931.8-1205.

* cited by examiner

*Primary Examiner* — Ryan A Jarrett
(74) *Attorney, Agent, or Firm* — McGinn IP Law Group, PLLC

(57) ABSTRACT

A program editing device is configured such that, when an arc-shaped partial path is selected from a machining path displayed on a display unit based on route information of each of plural blocks, the program editing device calculates a change amount of the radius of curvature of the selected partial path in accordance with an operation of changing the state of the arc of the selected partial path and revises the block corresponding to the selected partial path based on the change amount.

20 Claims, 10 Drawing Sheets

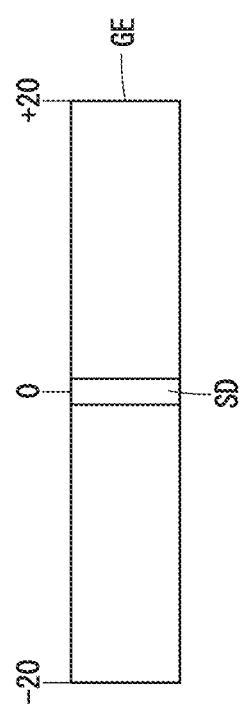

PROGRAM EDITING DEVICE, WIRE ELECTRICAL DISCHARGE MACHINE AND PROGRAM EDITING METHOD

CROSS-REFERENCE TO RELATED APPLICATIONS

This application is based upon and claims the benefit of priority from Japanese Patent Applications No. 2019-203211 filed on Nov. 8, 2019 and No. 2020-060204 filed on Mar. 30, 2020, the contents all of which are incorporated herein by reference.

BACKGROUND OF THE INVENTION

Field of the Invention

The present invention relates to a program editing device, a wire electrical discharge machine and a program editing method in which a machining program for specifying a machining path of a wire electrode with respect to a workpiece can be edited.

Description of the Related Art

The wire electrical discharge machine cuts a workpiece by generating electrical discharge at an electrode gap between the workpiece and a wire electrode while moving the wire electrode according to a machining path specified by a machining program. However, when the machining path includes an arc-shaped portion, the opposing area between the workpiece and the wire electrode at the electrode gap is liable to change in that portion, so that the resultant cut shape tends to deviate from the machining path specified by the machining program.

Japanese Laid-Open Patent Publication No. 2005-149016 discloses an apparatus that automatically modifies corners and the like stored in the program. Specifically, as the operator specifies plural points in a corner portion of the machining path displayed on the screen, selects one of the points and moves the selected point to a desired corrected position, the apparatus automatically modifies the corner portion.

SUMMARY OF THE INVENTION

However, in the apparatus disclosed in Japanese Laid-Open Patent Publication No. 2005-149016, the operator needs specify plural points in a corner portion of the machining path displayed on the screen, select one of the points and move the selected point to a desired corrected position. That is, the process needs more than a few steps.

It is therefore an object of the present invention to provide a program editing device, a wire electrical discharge machine, and a program editing method that can reduce the number of processing steps for editing a machining program.

The first aspect of the invention resides in a program editing device for editing a machining program in which a machining path of a wire electrode with respect to a workpiece is specified, wherein the machining program includes a plurality of blocks corresponding to a plurality of respective divided partial paths of the machining path, and each of the blocks has route information representing a corresponding partial path. The program editing device includes: a display controller configured to display the machining path on a display unit, based on the route information of each of the plurality of blocks; a calculation unit configured to perform calculation in a manner that, based on an operation of changing a selected one of the partial paths, or an approach point, in the machining path displayed on the display unit, the calculation unit calculating a change amount of the selected partial path or the approach point; and a revising unit configured to revise the block corresponding to the selected partial path or the approach point, based on the change amount.

The second aspect of the invention is a wire electrical discharge machine, which includes: the above program editing device; a machine main body; and a control device configured to control the machine main body based on the machining program.

The third aspect of the invention resides in a program editing method for editing a machining program in which a machining path of a wire electrode with respect to a workpiece is specified, wherein the machining program includes a plurality of blocks corresponding to a plurality of respective divided partial paths of the machining path, and each of the blocks has route information representing the corresponding partial path. The program editing method includes: a display control step of displaying the machining path on a display unit, based on the route information of each of the plurality of blocks; a calculating step of performing calculation in a manner that, based on an operation of changing a selected one of the partial paths, or an approach point, in the machining path displayed on the display unit, the calculating step calculating a change amount of the selected partial path or the approach point; and a revising step of revising the block corresponding to the selected partial path or the approach point, based on the change amount.

According to the aspects of the present invention, it is possible to change arc-shaped portions in the machining path for each of the blocks of the machining program. As a result, it is possible to reduce the work man-hour for editing the machining program, as compared to the case where a plural number of points are individually designated in each arc-shaped portion.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a diagram showing a display example of a display field in a modification 1;

FIG. 10 is a diagram showing another example of an adjustment pane in the modification 9.

DESCRIPTION OF THE PREFERRED EMBODIMENTS

The present invention will be detailed below by describing a preferred embodiment with reference to the accompanying drawings.

Embodiment

Figure 1:
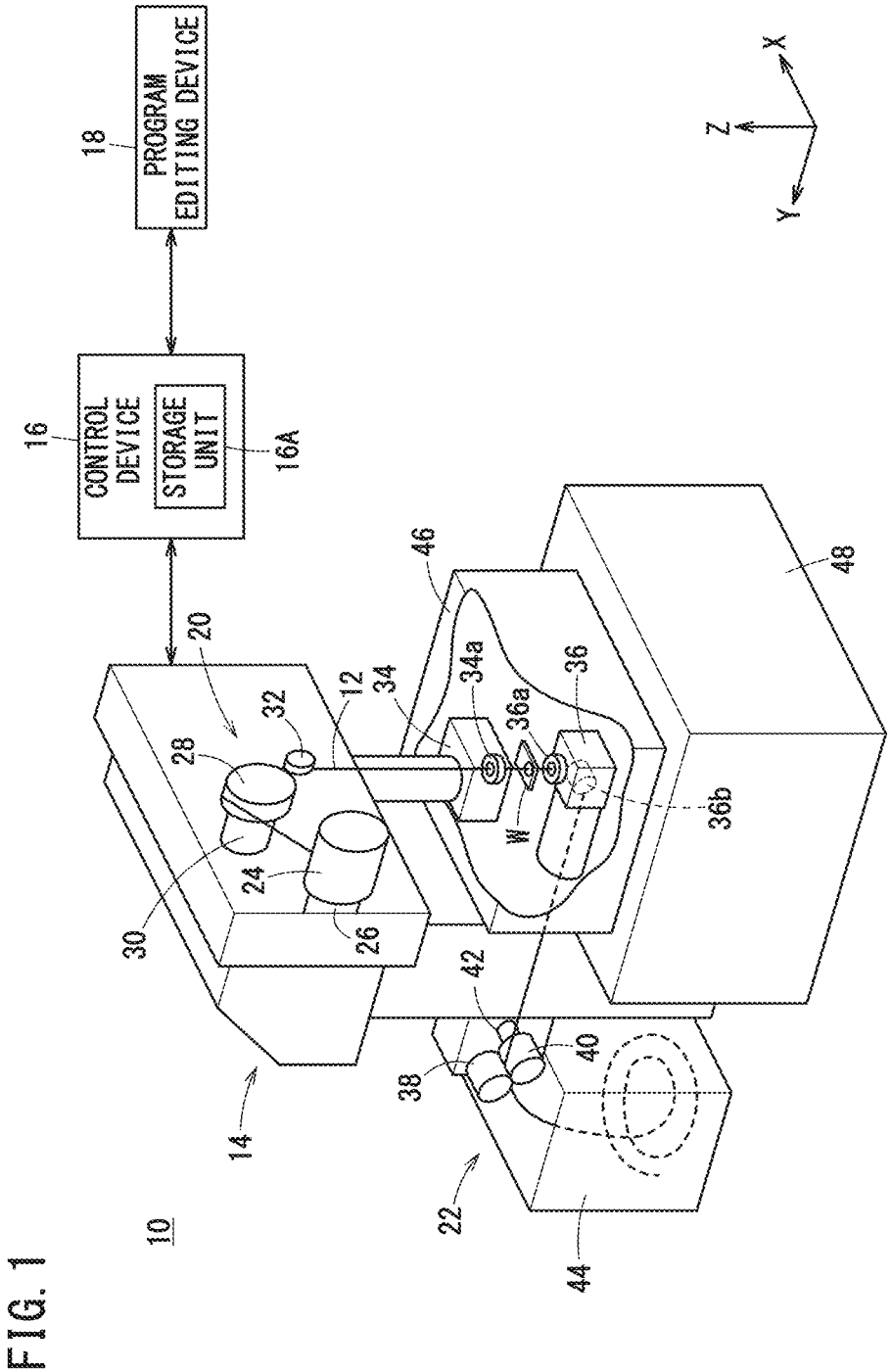
FIG. 1 is a schematic diagram showing a configuration of a wire electrical discharge machine of an embodiment.

The overall configuration of a wire electrical discharge machine 10 will be described with reference to FIG. 1. In FIG. 1, the X-axis direction, Y-axis direction and Z-axis direction of the wire electrical discharge machine 10 are shown. Note that the X-axis direction and the Y-axis direction are orthogonal to each other on a plane, and the Z-axis direction is orthogonal to each of the X-axis direction and the Y-axis direction.

The wire electrical discharge machine 10 is a machine tool that generates electrical discharge at an electrode gap between the workpiece W and a wire electrode 12 in a working fluid by applying voltage to the gap to machine the workpiece W. The wire electrical discharge machine 10 includes a machine main body 14, a control device 16 and a program editing device 18.

The wire electrode 12 is formed of, for example, metal material such as tungsten-based, copper alloy-based and brass-based material. On the other hand, the workpiece W is formed of, for example, metal material such as iron-based material and superhard material (tungsten carbide).

The machine main body 14 includes a supply system 20 that supplies the wire electrode 12 toward the workpiece W (work, machined object), and a collecting system 22 that collects the wire electrode 12 having passed through the workpiece W.

The supply system 20 includes a wire bobbin 24 on which a fresh wire electrode 12 is wound, a torque motor 26 that applies a torque to the wire bobbin 24, a brake shoe 28 for applying a braking force to the wire electrode 12 by friction, a brake motor 30 for applying a brake torque to the brake shoe 28, a tension detector 32 for detecting the magnitude of the tension of the wire electrode 12, and a die guide (upper die guide) 34 for guiding the wire electrode 12 at a position above the workpiece W.

The collecting system 22 includes a die guide (lower die guide) 36 for guiding the wire electrode 12 at a position below the workpiece W, a pinch roller 38 and a feed roller 40 capable of nipping the wire electrode 12 therebetween, a torque motor 42 for applying a torque to the feed roller 40, and a collection box 44 for collecting the used wire electrode 12 transferred by the pinch roller 38 and the feed roller 40.

The machine main body 14 includes a work-pan 46 capable of storing a working fluid such as deionized water or oil used during machining. The work-pan 46 is mounted on a base 48. The die guides 34 and 36 are arranged in the work-pan 46, and the workpiece W is placed between the die guides 34 and 36. The die guides 34, 36, and the workpiece W are submerged in the working fluid stored in the work-pan 46.

The die guides 34 and 36 have respective support blocks 34a and 36a for supporting the wire electrode 12. The die guide 36 includes a guide roller 36b that guides the wire electrode 12, deflecting its travel toward the pinch roller 38 and the feed roller 40.

The die guide 34 jets a clean working fluid free from sludge (cut debris) toward the electrode gap formed between the wire electrode 12 and the workpiece W. This makes it possible to fill the electrode gap with the clean liquid suitable for machining, and prevent a reduction in machine accuracy due to sludge generated during machining. The die guide 36 may also jet a clean working fluid free from sludge (cut debris) toward the electrode gap.

The control device 16 controls the machine main body 14 according to the machining program and machining conditions. The machining program and machining conditions are stored in a storage unit 16A in the control device 16.

The machining conditions include the pulse interval between voltage pulses repeatedly applied to the electrode gap between the wire electrode 12 and the workpiece W, the average of voltage applied per unit time to the electrode gap, the relative motion speed of the wire electrode 12 with respect to the workpiece W, and the feed rate of the wire electrode 12.

Note that the pulse interval is a pause time during which no voltage pulse is applied to the electrode gap between the workpiece W and the wire electrode 12. The relative motion speed of the wire electrode 12 with respect to the workpiece W is the speed at which the wire electrode 12 is moved relative to the workpiece W. The feed rate is the speed at which the wire electrode 12 travels in the direction the wire electrode 12 extends.

When voltage pulses are applied to the electrode gap between the workpiece W and the wire electrode 12, the control device 16 controls an unillustrated power unit in the machine main body 14, based on the average voltage per unit time, the pulse interval and the like, stored in the storage unit 16A. Thus, the voltage pulse is repeatedly applied at a predetermined cycle to the electrode gap between the workpiece W and the wire electrode 12 from the power unit.

When moving the wire electrode 12 relative to the workpiece W, the control device 16, based on the machining program, the relative motion speed of the wire electrode 12 with respect to the machining workpiece W, and the like, stored in the storage unit 16A, controls the motors of the die guides 34 and 36. The wire electrode 12 is thereby relatively moved in at least one of the X-axis direction and the Y-axis direction with respect to the workpiece W along the machining path specified in the machining program. Here, instead of controlling the motors of the die guides 34 and 36, the control device 16 may control the motors of an unillustrated table on which the workpiece W is fixed.

When feeding the wire electrode 12 in the wire running direction, the control device 16, based on the feed rate and the like stored in the storage unit 16A, controls the torque motors 26 and 42. Torque is thereby applied to the wire bobbin 24 and the feed roller 40 from the torque motors 26 and 42, whereby the wire electrode 12 in contact with the wire bobbin 24 and the feed roller 40 is sent in the running direction. The running direction of the wire electrode 12 (negative Z-axis direction) and the moving direction of the wire electrode 12 (X-axis direction, Y-axis direction) being moved relative to the workpiece W intersect.

Figure 2:
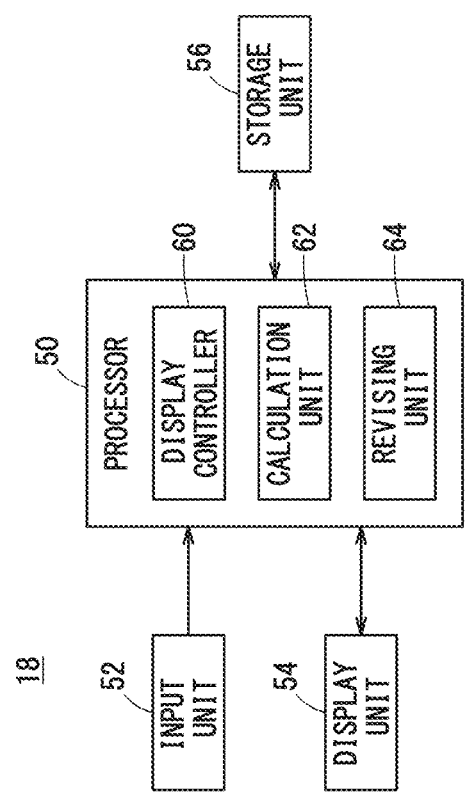
FIG. 2 is a schematic diagram showing a configuration of a program editing device.

The program editing device 18 is to edit machining programs. Referring next to FIG. 2, the configuration of the program editing device 18 will be described. The program editing device 18 includes a processor 50, an input unit 52, a display unit 54 and a storage unit 56.

The processor 50 processes information, and specific examples of the processor 50 include a CPU, a GPU and the like. The input unit 52 inputs information and is used to allow control by an operator. Specific examples of the input unit 52 include a mouse, a keyboard and a touch panel arranged on the display screen of the display unit 54. The display unit 54 displays information, and a specific example of the display unit 54 is a liquid crystal display. The storage unit 56 stores information, and specific examples of the storage unit 56 include a hard disk and the like. The storage unit 56 stores basic software for executing a program editing process for editing a machining program.

When running the basic software stored in the storage unit 56, the processor 50 reads out a machining program stored in the storage unit 16A of the control device 16 and executes a program editing process for editing the read machining program. In this case, the processor 50 functions as a display controller 60, a calculation unit 62, and a revising unit 64.

The display controller 60 analyzes the machining program read from the storage unit 16A of the control device 16. In the machining program, the machining path is divided into a plurality of partial paths, which are each represented and defined in block units as route information. That is, the machining program has blocks corresponding to respective partial paths obtained by dividing the machining path, and each of the blocks has route information representing a corresponding partial path.

Figure 3:
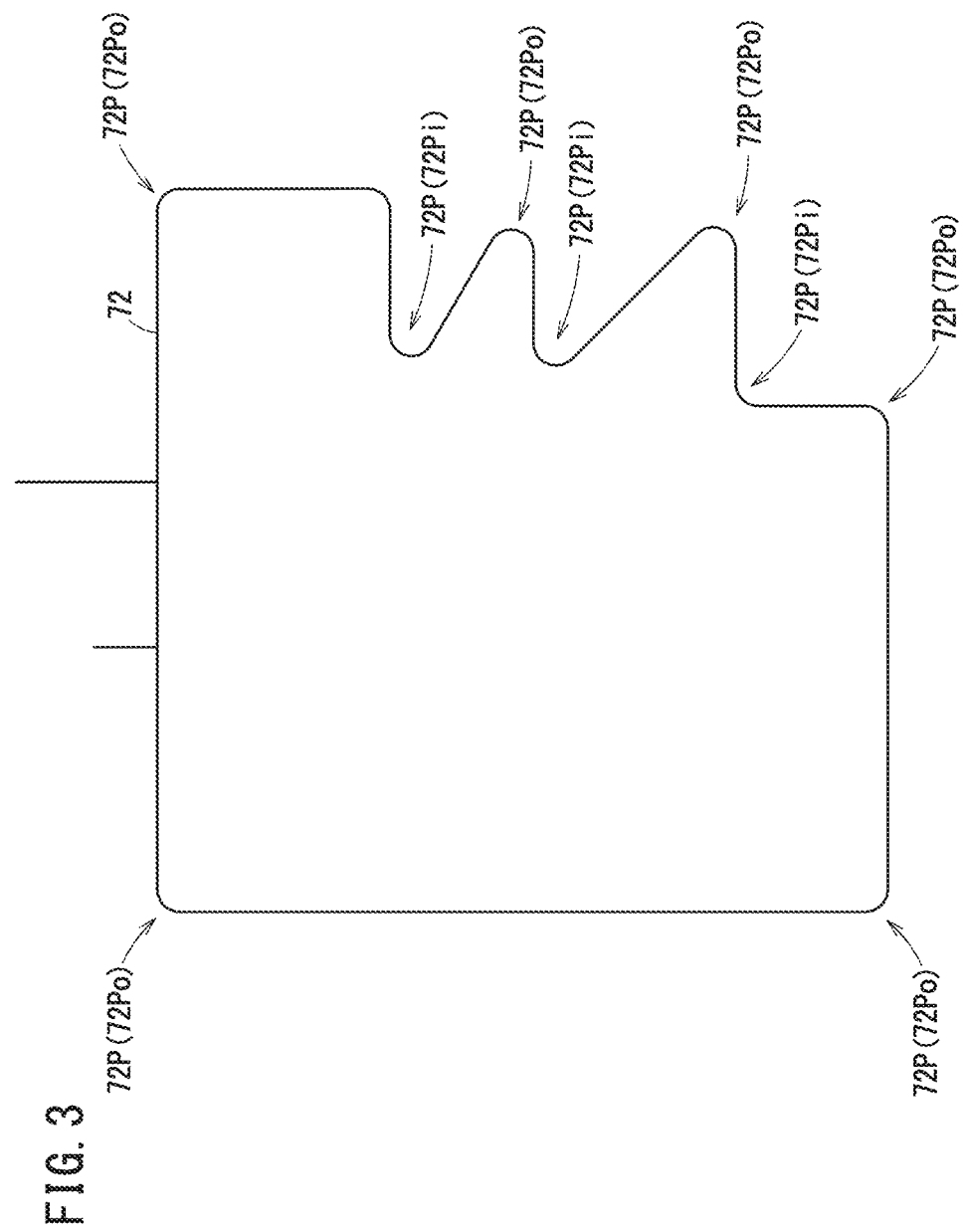
FIG. 3 is a diagram showing a display example of a machining path.

The display controller 60 analyzes the machining program to recognize route information of each of the plural blocks, and based on the recognized route information, displays a machining path 72 on the display unit 54 as shown in FIG. 3.

Here, the operator can use the input unit 52 to perform a shape changing operation for changing the arc state of an arc-shaped partial path 72P in the machining path 72 displayed on the display unit 54. When there are plural arc-shaped partial paths 72P as in the example of FIG. 3, the operator can perform a shape changing operation for each of the arc-shaped partial paths 72P. In this case, the arc-shaped partial paths 72P include partial paths 72Pi having a concave arc shape (inward corner) where the machining path 72 curves inwards and partial paths 72Po having a convex arc shape (outward corner) where the machining path 72 curves outward.

When the input unit 52 has a touch panel, the shape changing operation can be performed by swiping the partial path 72P to be operated. Therefore, provision of a touch panel for the input unit 52 allows the operator to perform an intuitive operation such as to actually move the arc-shaped partial path 72P displayed on the display unit 54.

Figure 4:
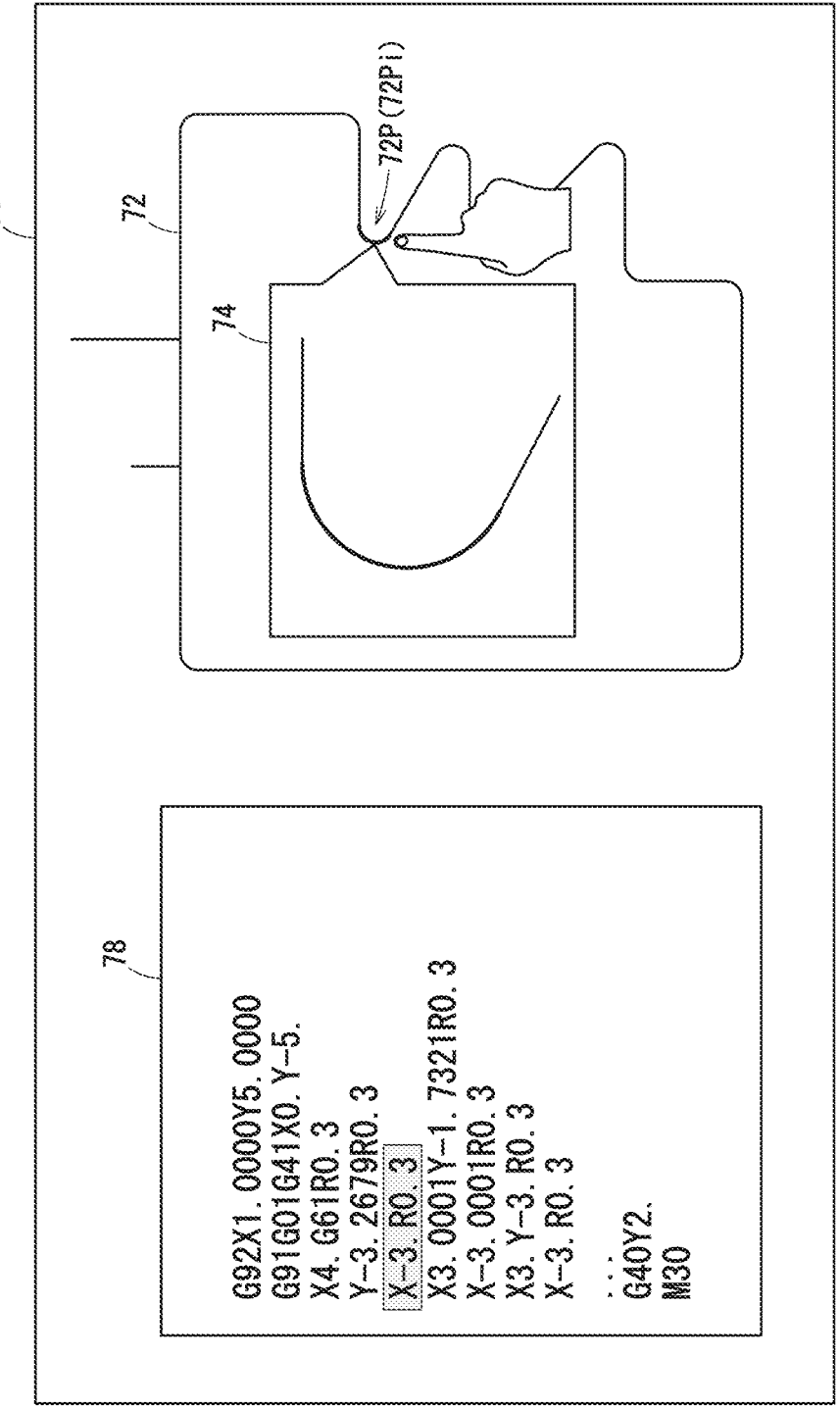
FIG. 4 is a diagram showing an example of a first state of program editing.

When an arc-shaped partial path 72P is selected, the display controller 60 emphasizes the selected target, i.e., the selected partial path 72P as shown in FIG. 4, for example. This makes it possible to clarify the partial path 72P as the selected target, and enables the operator to easily recognize the selected partial path 72P.

The mode for emphasizing the selected partial path 72P is not particularly limited. For example, as illustrated in FIG. 4, the display controller 60 may emphasize the selected partial path 72P by displaying the selected partial path 72P in an enlarged frame 74. Further, the display controller 60 may emphasize the selected partial path 72P by differentiating its color from that of the partial paths 72P other than the selected target. Alternatively, the display controller 60 may emphasize the selected partial path 72P by making the line width of the selected partial path 72P thicker than that of the partial paths 72P other than the selected target. Moreover, the display controller 60 may emphasize the selected partial path 72P by using a combination of at least the above two modes.

When an arc-shaped partial path 72P is selected, the display controller 60 may emphasize the selected partial path 72P and at the same time cause the display unit 54 to display the route information of the block corresponding to the selected partial path 72P.

In the example of FIG. 4, the display controller 60 displays the machining path 72 on the right side of a display screen 76 and a display field 78 showing the route information on the left side of the display screen 76. Further, the display controller 60 shows in the display field 78 the route information on the blocks for the selected partial path 72P and the adjacent partial paths 72P connected to the selected target path 72P. When showing the route information on the blocks for the selected partial path 72P and the adjacent partial paths 72P connected to the selected target path 72P, the display controller 60 may emphasize the route information of the block corresponding to the selected partial path 72P. In the example of FIG. 4, "R" of the highlighted part in the display field 78 indicates a path section to be machined into an arc shape, and "0.3" on the right side of "R" indicates the numerical value of the radius of curvature.

Figure 5:
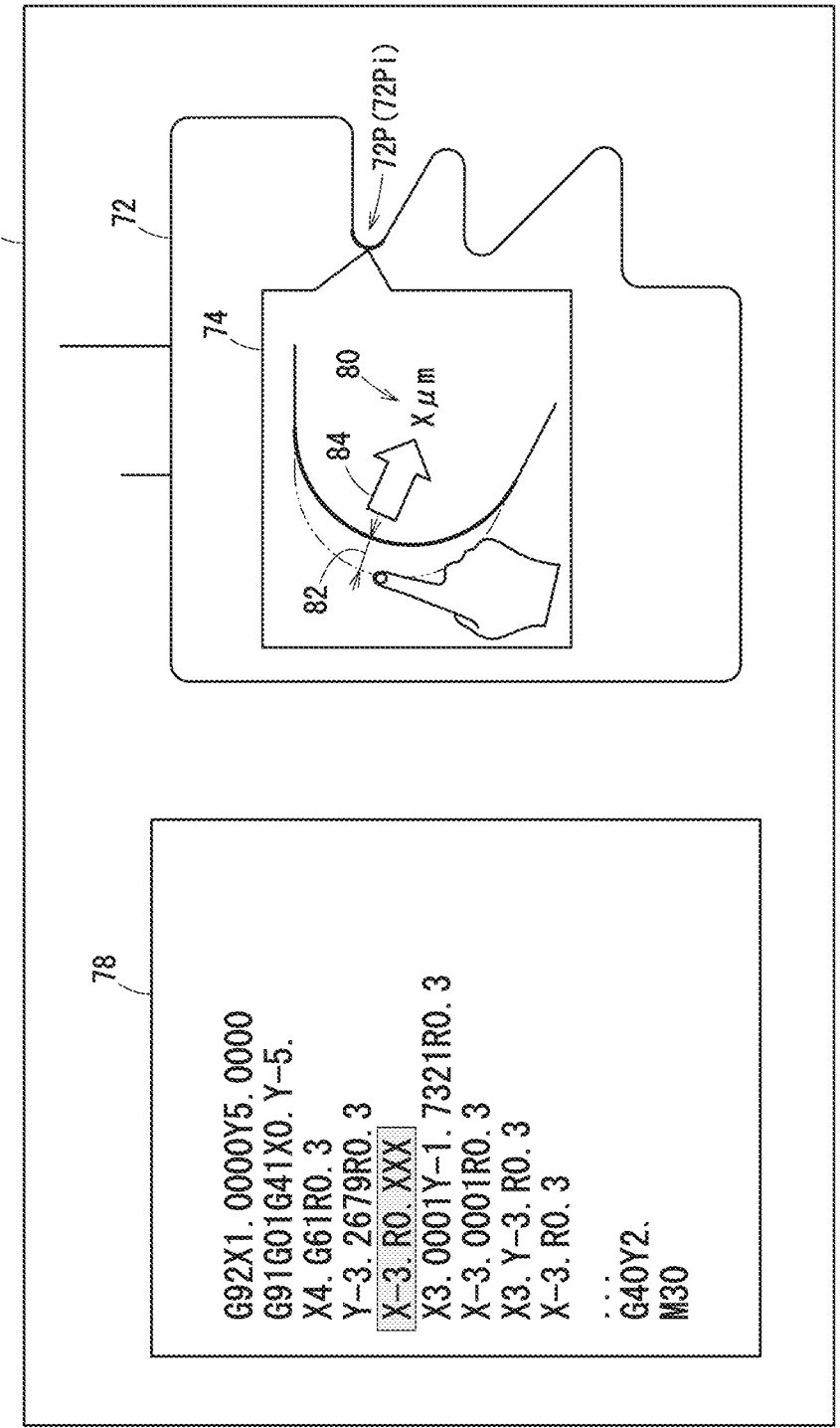
FIG. 5 is a diagram showing an example of a second state of program editing.

When a shape changing operation is performed on the selected partial path 72P, the display controller 60 revises the display of the emphasized, selected partial path 72P so as to follow the shape changing operation as shown in FIG. 5, for example. The operated state of the shape changing operation can thereby be clarified so that the operator can easily understand the operational state.

When a shape changing operation is performed on the selected partial path 72P, the display controller 60 causes the display unit 54 to display a change amount 80 of the radius of curvature of the partial path 72P, between before and after the change. This makes it possible to clarify how much the radius of curvature of the partial path 72P is changed by the shape changing operation, and enables the operator to easily understand the degree of change of the radius of curvature. Here, the calculation unit 62 calculates the change amount 80.

When a shape changing operation is performed on the selected partial path 72P in the case where the display controller 60 has displayed the route information corresponding to the selected partial path 72P, the display controller 60 changes the radius of curvature included in this route information accordingly to the shape changing operation. The radius of curvature after the change is calculated by the revising unit 64. In the example of FIG. 5, "0.XXX" on the right side of "R" represents the numerical value of the changed radius of curvature.

When an arc-shaped partial path 72P is selected, the calculation unit 62 calculates the change amount 80 of the radius of curvature of the selected partial path 72P based on the shape changing operation on the selected partial path 72P.

The calculation unit 62, based on the operation signal output from the input unit 52, identifies an operational amount (shift amount) 82 and an operational direction (shift direction) 84 from the selected position of the selected partial path 72P. The calculation unit 62 also identifies the radius of curvature and the shape type from the route information included in the block of the selected partial path 72P. The shape type includes a concave arc shape (inward corner) where the machining path 72 curves inwards and a convex arc shape (outward corner) where the machining path 72 curves outward.

The calculation unit 62, based on the identified operational amount (shift amount) 82, the operational direction (shift direction) 84, the radius of curvature and the shape type, calculates the change amount 80 of the radius of curvature of the partial path 72P, between before and after the change.

When the shape type is an inward corner, the more greatly the selected position is moved outwards (in the operational direction (shift direction) 84 outward) with respect to the machining path 72 by the operational amount (shift amount) 82 (or the larger the operational amount 82 is), the larger the change amount 80 of the radius of curvature becomes, between before and after the change. Also, the more greatly the selected position is moved inwards (in the operational direction (shift direction) 84 inward) with respect to the machining path 72 by the operational amount (shift amount) 82 (or the larger the operational amount 82 is), the larger the change amount 80 of the radius of curvature becomes, between before and after the change.

When the shape type is an outward corner, the more greatly the selected position is moved outwards (in the operational direction (shift direction) 84 outward) with respect to the machining path 72 by the operational amount (shift amount) 82 (or the larger the operational amount 82 is), the larger the change amount 80 of the radius of curvature becomes, between before and after the change. Also, the more greatly the selected position is moved inwards (in the operational direction (shift direction) 84 inward) with respect to the machining path 72 by the operational amount (shift amount) 82 (or the larger the operational amount 82 is), the larger the change amount 80 of the radius of curvature becomes, between before and after the change.

The change amount 80 may be different from the change amount of the radius of curvature on the display unit 54. In this case, the calculation unit 62 may calculate the change amount 80 by using the relational expression of "$X = \alpha \times Y$", where $\alpha$ is a coefficient attributed to the difference between the scale on the display unit 54 and the actual scale, X is the change amount 80, and Y is the change amount of the radius of curvature on the display unit 54.

The revising unit 64 is to change the route information of the block corresponding to the selected partial path 72P based on the change amount 80 calculated by the calculation unit 62. The revising unit 64 calculates the radius of curvature by adding/subtracting the change amount 80 to/from the radius of curvature before the change, and changes the current radius of curvature set in the route information of the block corresponding to the selected partial path 72P into the calculated radius of curvature. The radius of curvature before the change is the standard radius of curvature set in the route information when the machining path 72 is displayed on the display unit 54.

Figure 6:
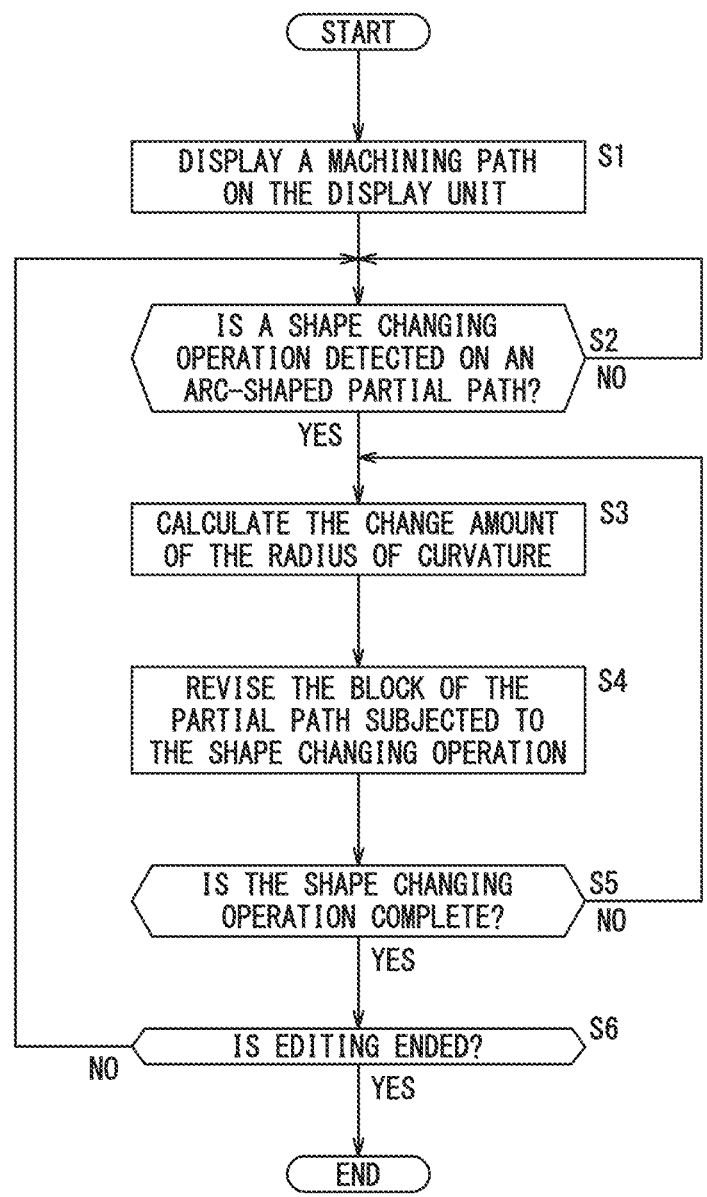
FIG. 6 is a flowchart showing the flow of a program editing process.

Next, regarding the program editing method of the program editing device 18, the flow of the program editing process in the program editing device 18 will be described with reference to FIG. 6.

The program editing process proceeds to step S1 when an editing command for editing the machining program is received from the input unit 52.

At step S1, the display controller 60, based on the route information possessed by each of the plural blocks in the machining program to be edited, causes the display unit 54 to display a machining path 72. When the machining path 72 is displayed on the display unit 54, the program editing process proceeds to step S2.

At step S2, the display controller 60 and the calculation unit 62 start a process of monitoring the operation signals output from the input unit 52. When the display controller 60 detects a selection operation of selecting an arc-shaped partial path 72P, the display controller 60 emphasizes the selected partial path 72P. Further, when the display controller 60 and the calculation unit 62 detect a shape changing operation on the selected arc-shaped partial path 72P, the program editing process proceeds to step S3.

At step S3, the display controller 60 starts a display changing process for changing the display of the selected partial path 72P, following the shape changing operation. The calculation unit 62, based on the shape changing operation on the selected partial path 72P, starts a change amount calculation process for calculating the change amount 80 of the radius of curvature of the selected partial path 72P. When the process at step S3 is started, the program editing process proceeds to step S4.

At step S4, the revising unit 64 starts an information revising process for revising the block (the radius of curvature in the block) corresponding to the selected partial path 72P based on the change amount 80 calculated at step S3. The display controller 60 starts a display process for displaying the change amount 80 calculated at step S3 on the display unit 54. When the display controller 60 displays the display field 78 showing the route information together with the machining path 72, the display controller 60 starts a process of changing the radius of curvature of the route information shown in the display field 78 to the radius of curvature of the block that has been changed by the revising unit 64, at the same time with the above display process. When the process of step S4 is started, the program editing process proceeds to step S5.

At step S5, the display controller 60 and the calculation unit 62 determine whether or not to continue the processing started at steps S3 and S4, based on the operation signals output from the input unit 52. Here, the display controller 60 and the calculation unit 62 determine that the processing started at steps S3 and S4 is continued while a shape changing operation is detected. In this case, the program editing process returns to step S3. On the other hand, when the display controller 60 and the calculation unit 62 no longer detect any shape changing operation, it is determined that the processing started at steps S3 and S4 is not continued. In this case, the display controller 60, the calculation unit 62, and the revising unit 64 end the processing started at steps S3 and S4, and the program editing process proceeds to step S6.

At step S6, the display controller 60 determines whether or not to continue editing the machining program. Here, for example, when the display controller 60 has not received any end command to end the editing of the machining program from the input unit 52, the display controller 60 determines that the editing of the machining program is continued. In this case, the program editing process returns to step S2. On the other hand, for example, when the input unit 52 receives an end command to end the editing of the machining program, the display controller 60 determines that the editing of the machining program is not continued. In this case, the display controller 60 hides the machining path 72 displayed at step S1. Then, the program editing process ends.

[Modification]

The above embodiment may be modified as follows.

(Modification 1)

In the above embodiment, the revising unit 64 changes the radius of curvature of the route information of the block corresponding to the selected partial path 72P, to thereby revise the block. In this modification, the revising unit 64 adds a compensation amount of a machining condition to the route information of the block corresponding to the selected partial path 72P, to thereby revise the block.

The machining conditions are set in the control device 16 of the wire electrical discharge machine 10, and are stored in the storage unit 16A of the control device 16. The machining condition is the feed rate of the wire electrode 12 in this modification.

The revising unit 64 determines the compensation amount of the feed rate of the wire electrode 12 based on the change amount 80 of the selected partial path 72P calculated by the calculation unit 62. Specifically, the revising unit 64 determines a compensation amount that slows down the feed rate of the wire electrode 12 as the change amount 80 increases. When the compensation amount is determined, the revising unit 64 adds the obtained compensation amount to the route information of the block corresponding to the selected partial path 72P. This method can also individually change the machining state of the arc-shaped partial path 72P as in the above embodiment.

When the display field 78 showing the route information is displayed together with the machining path 72, the display controller 60 displays the compensation amount that the revising unit 64 added to the route information, in the route information shown in the display field 78, as shown in FIG. 7, for example. In the example of FIG. 7, "Z" in the highlighted portion in the display field 78 indicates a path section to be machined by changing the feed rate of the wire electrode 12, and "oo" on the right side of "Z" represents the numerical value of the compensation amount.

(Modification 2)

The pause time may be applied instead of the feed rate of the wire electrode 12 in the above modification 1. The pause time is the pulse interval between voltage pulses repeatedly applied between the workpiece W and the wire electrode 12. When the pause time is applied as a machining condition, the revising unit 64 determines a compensation amount that shortens the pause time as the change amount 80 increases. This method can also individually change the machining state of the arc-shaped partial path 72P as in the above embodiment.

(Modification 3)

The average voltage applied per unit time may be applied instead of the feed rate of the wire electrode 12 in the above modification 1. The average voltage applied per unit time is the average of the total amount of voltage pulses repeatedly applied per unit time. When the average voltage applied per unit time is applied as a machining condition, the revising unit 64 determines a compensation amount that increases the average voltage applied per unit time as the change amount 80 increases. This method can also individually change the machining state of the arc-shaped partial path 72P as in the above embodiment.

(Modification 4)

In addition to the feed rate of the wire electrode 12 in the above modification 1, one or both of the pause time of the modification 2 and the average voltage applied per unit time of the modification 3 may be applied. By adding the compensation amounts of plural machining conditions to the route information, it becomes easier to finely adjust the machining state of the arc-shaped partial path 72P as compared with the case where the compensation amount as to only one machining condition is added to the route information.

(Modification 5)

The revising unit 64 may change the radius of curvature of the route information included in the block corresponding to the selected partial path 72P and also add a compensation amount of the machining condition to the route information. This makes it possible to finely adjust the machining state of the arc-shaped partial path 72P.

(Modification 6)

The revising unit 64 may have a first mode for changing the radius of curvature of the route information of the block corresponding to the selected partial path 72P, and a second mode for adding a compensation amount of machining condition to the route information. In this modification, the revising unit 64 executes, for example, the first mode or the second mode selected according to the operator's selecting operation through the input unit 52. The machining state of the arc-shaped partial path 72P can thereby be adjusted by selecting the first mode and the second mode according to the shape of the arc-shaped partial path 72P, the material of the workpiece W and others.

(Modification 7)

The revising unit 64 may revise any block corresponding to a partial path 72P similar to the selected partial path 72P in addition to the block corresponding to the selected partial path 72P. In the case of this modification, the processor 50 is added with a functional entity that works as an acquisition unit for acquiring a partial path 72P similar to the selected partial path 72P as a similar partial path.

The acquisition unit may acquire one or more partial paths 72P specified by the operator as similar partial paths. Further, the acquisition unit may acquire one or more partial paths 72P as similar partial paths, whose corresponding blocks have route information including radii of curvature that fall within a predetermined range, from the radius of curvature of the route information included in the block corresponding to the selected partial path 72P. That is, the difference between the radius of curvature in the route information of the block corresponding to the acquired similar partial path 72P and the radius of curvature in the route information of the block corresponding to the selected partial path 72P, falls within the predetermined range.

The revising unit 64 revises the block corresponding to the selected partial path 72P and the block(s) corresponding to the partial path(s) 72P acquired by the acquisition unit as the similar partial path(s). The machining state of the partial paths 72P having similar arc shapes can thereby be revised collectively.

(Modification 8)

Figure 8:
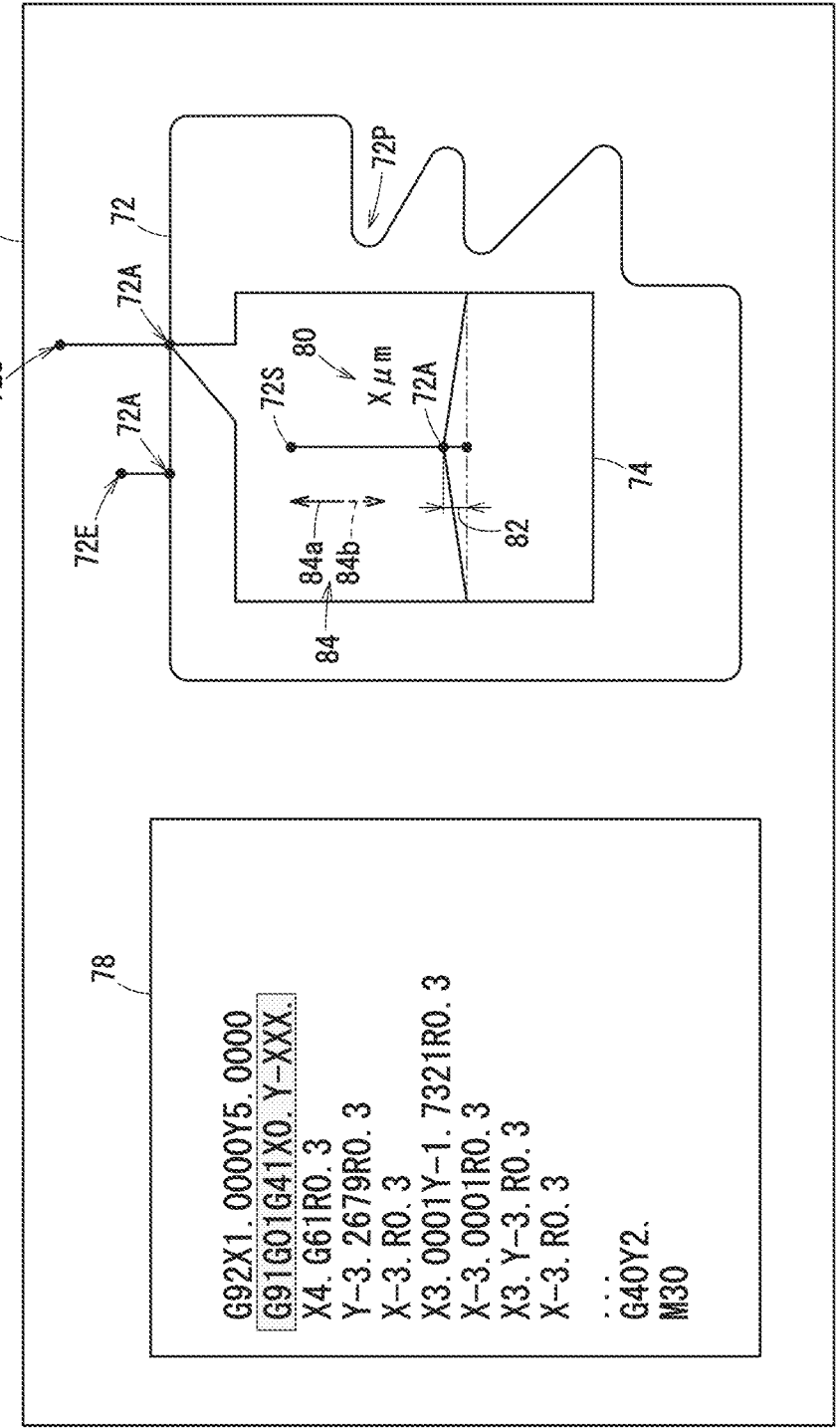
FIG. 8 is a diagram showing an example of a state of program editing in a modification 8.

FIG. 8 is a diagram illustrating a state of program editing of the modification 8. In FIG. 8, the same reference numerals are given to the configurations equivalent to those described in the above embodiment. In this modification, the description repeating the above embodiment will be omitted.

In this modification, an approach point 72A is selected from the machining path 72 displayed on the display unit 54 so as to move the position of the selected approach point 72A by an operation for changing (position changing operation). When the approach point 72A is selected, the display controller 60 emphasizes the selected approach point 72A.

In this modification, the display controller 60 emphasizes the approach point 72A by displaying an enlarged frame 74 that shows a partial path in the vicinity including the approach point 72A for enlargement. Further, in the present modification, the display controller 60 displays the route information on the blocks corresponding to the partial path including the approach point 72A and the partial paths connected to the partial path in the display field 78, together with the enlarged frame 74. In the example of FIG. 8, the route information of the partial path including the approach point 72A is highlighted. The highlighted portion "X0.Y-XXX." represents the position of the approach point 72A.

When a position changing operation is performed on the approach point 72A, the display controller 60 changes the display of the approach point 72A. In this case, the display controller 60 limits the operational direction 84 in which the approach point 72A is moved, to a first operational direction 84a from the approach point 72A toward a machining start point 72S (or a machining end point 72E) and a second operational direction 84b opposite the first operational direction 84a. That is, the display controller 60 moves the approach point 72A on the image so as to follow the first operational direction 84a or the second operational direction 84b in the position changing operation. For example, when the approach point 72A illustrated in FIG. 8 is repositioned to the upper right on the paper surface, the approach point 72A on the image is not moved to the right side on the paper surface but is moved only in the upward direction (first operational direction 84a).

Further, when a position changing operation has been performed on the approach point 72A, the display controller 60 displays the change amount 80 of position moved in the first operational direction 84a or the second operational direction 84b between before and after the change, on the display unit 54. In this case, the display controller 60 updates the position of the approach point 72A, which is highlighted in the display field 78, in accordance with the change amount 80.

When the approach point 72A is selected, the calculation unit 62 calculates the change amount 80 of the approach point 72A based on the operation (position changing operation) on the selected approach point 72A. That is, the calculation unit 62 identifies the operational amount (shift amount) 82 and the operational direction (shift direction) 84 from the selected position of the approach point 72A based on the operation signal output from the input unit 52, and calculates the change amount 80 of position in the first operational direction 84a or the second operational direction 84b between before and after the change, based on the identified operational amount (shift amount) 82 and the operational direction (shift direction) 84.

The change amount 80 may be different from the change amount of the position on the display unit 54. In this case, the calculation unit 62 may calculate the change amount 80 by using the relational expression of "x=αxy", where α is a coefficient attributed to the difference between the scale on the display unit 54 and the actual scale, x is the change amount 80, and y is the change amount of the position on the display unit 54.

Based on the change amount 80 calculated by the calculation unit 62, the revising unit 64 changes the position of the approach point 72A set in the route information of the block corresponding to the approach point 72A to the position calculated by the calculation unit 62. The position before the change is the standard position set in the route information when the machining path 72 is displayed on the display unit 54.

As described above, according to the present modification, it is possible to revise the route information of the block corresponding to an approach point 72A, based on the change amount 80 shifted by the operation (position changing operation) of changing the position of the approach point 72A on the machining path 72 displayed on the display unit 54.

(Modification 9)

Figure 9:
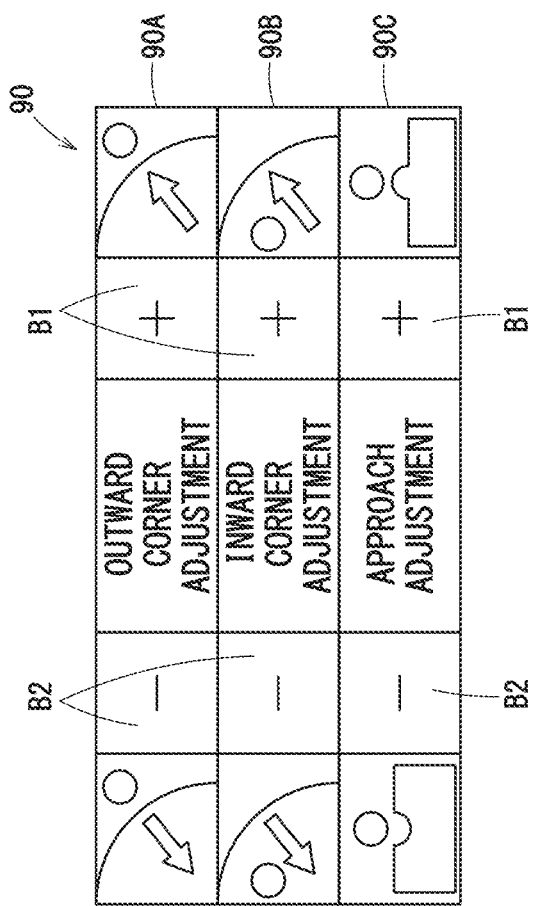
FIG. 9 is a diagram showing an example of an adjustment pane in a modification 9.

FIG. 9 is a diagram showing an example of an adjustment pane of a modification 9. The display controller 60 may display an adjustment pane 90 for allowing adjustment of the arc-shaped partial path 72P or the approach point 72A, instead of the enlarged frame 74. The adjustment pane 90 includes an outward corner adjustment field 90A for adjusting outward corners, an inward corner adjustment field 90B for adjusting inward corners, and an approach adjustment field 90C for adjusting an approach point 72A. An increment button B1 and a decrement button B2 are provided in each of the outward corner adjustment field 90A, the inward corner adjustment field 90B, and the approach adjustment field 90C.

The greater the number of times the increment button B1 of the outward corner adjustment field 90A or the inward corner adjustment field 90B is pressed, or the longer the pressed (long press) time, the larger the change amount 80 of the radius of curvature calculated by the calculation unit 62 becomes. Also, the greater the number of times the decrement button B2 of the outward corner adjustment field 90A or the inward corner adjustment field 90B is pressed, or the longer the pressed (long press) time, the larger the change amount 80 of the radius of curvature calculated by the calculation unit 62 becomes. Thus, an operation on the adjustment pane 90 also makes it possible to change the route information of the block corresponding to the partial path 72P, as in the above embodiment.

The more times the increment button B1 in the approach adjustment field 90C is pressed, or the longer the pressed (long press) time is, the greater the change amount 80 of the position in the first operational direction 84a calculated by the calculation unit 62. On the other hand, the more times the decrement button B2 in the approach adjustment field 90C is pressed, or the longer the pressed (long press) time is, the greater the change amount 80 of the position in the second operational direction 84b calculated by the calculation unit 62. Thus, an operation on the adjustment pane 90 makes it possible to change the route information of the block corresponding to the approach point 72A as in the above modification 8.

Note that the increment button B1 and the decrement button B2 on the adjustment pane 90 may be replaced with a gauge GE and a slider SD that slides the gauge GE, as shown in FIG. 10. The initial position of the slider SD is set at the position of "0" on the gauge GE, and the farther the slider SD is from the position to the positive side, the greater the change amount 80 of the radius of curvature or the position in the first operational direction 84a calculated by the calculation unit 62. As the slider SD is away from the position of "0" on the gauge GE to the negative side, the change amount 80 of the radius of curvature becomes smaller, or the change amount 80 of the position in the second operational direction 84b becomes greater.

(Modification 10)

The above embodiment and modifications may be arbitrarily combined as long as no technical inconsistency occurs.

[Aspects of the Invention]

As the invention grasped from the above embodiment, the first, second and third aspects of inventions will be described.

(First Aspect of the Invention)

The first aspect of the invention resides in the program editing device (18) for editing a machining program in which the machining path (72) of the wire electrode (12) with respect to the workpiece (W) is specified. The machining program includes the plurality of blocks corresponding to the plurality of respective divided plural partial paths (72P) of the machining path (72), and each of the blocks has route information representing the corresponding partial path (72P). The program editing device (18), includes: the display controller (60) configured to display the machining path (72) on the display unit (54), based on the route information of each of the plurality of blocks; the calculation unit (62) configured to perform calculation in a manner that, based on an operation of changing a selected one of the partial paths (72P), or the approach point (72A), in the machining path (72) displayed on the display unit (54), the calculation unit (62) calculating the change amount (80) of the selected partial path (72P) or the approach point (72A); and the revising unit (64) configured to revise the block corresponding to the selected partial path (72P) or the approach point (72A), based on the change amount (80).

This configuration enables change of arc-shaped portions in the machining path (72) for each of the blocks of the machining program. As a result, it is possible to reduce the work man-hour for editing the machining program, compared to a case where plural points are individually designated in the arc-shaped portion.

The revising unit (64) may be configured to change the radius of curvature of the route information of the block corresponding to the selected partial path (72P). This makes it possible to change an arc-shaped portion of the machining path (72) directly and facilitate adjustment of the machining state of the arc-shaped portion.

The revising unit (64) may be configured to add a compensation amount of a machining condition set in the control device (16) of the wire electrical discharge machine (10) to the route information of the block corresponding to the selected partial path (72P). This makes it possible to change an arc-shaped portion of the machining path (72) indirectly and facilitate fine adjustment of the machining state of the arc-shaped portion.

The revising unit (64) may be configured to execute the first mode for changing the radius of curvature of the route information of the block or the second mode for adding a compensation amount of a machining condition set in a control device (16) of a wire electrical discharge machine (10) to the route information of the block. This configuration enables adjustment of the machining state of an arc-shaped portion by selecting either the first or second mode in accordance with the shape of the arc-shaped partial path (72P), the material of the workpiece (W) and other factors.

The machining condition may include at least one of the feed rate of the wire electrode (12), the pulse interval between voltage pulses repeatedly applied between the workpiece (W) and the wire electrode (12) and the average voltage applied per unit time. The revising unit (64) may be configured to add a compensation amount for compensation of at least one of the feed rate, the pulse interval and the average voltage. This enables fine adjustment of the machining state of an arc-shaped portion.

The program editing device (18) may further includes the input unit (52) configured to allow the operation, and the input unit (52) may include a touch panel provided on the display screen of the display unit (54). This allows the operator to perform an intuitive operation such as to actually move the arc-shaped partial path (72P) displayed on the display unit (54).

The display controller (60) may be configured to emphasize the selected partial path (72P) and change the display of the emphasized partial path (72P) so as to follow the operation of changing. This configuration makes it possible to clarify the selected partial path (72P) and also the operational state of the operation.

The display controller (60) may be configured to display the change amount (80) calculated by the calculation unit (62). This makes it possible to clarify how much the change amount (80) varies by the operation, hence makes the operator know the degree of change.

The program editing device (18) may further include an acquisition unit configured to acquire a partial path (72P) that is similar to the selected partial path (72P), as a similar partial path. The revising unit (64) may be configured to revise the block corresponding to the selected partial path (72P) and the block corresponding to the partial path (72P) that has been acquired as the similar partial path by the acquisition unit. This configuration makes it possible to revise the machining state of the partial paths 72P having similar arc shapes, collectively.

The acquisition unit may be configured to acquire one or more partial paths (72P) designated by the operator, as the similar partial paths. This allows the operator to handle the partial paths (72P) to be changed in their machining state, collectively in accordance with the operator's intention.

The acquisition unit may be configured to acquire one or more partial paths (72P) as the similar partial paths (72P), whose corresponding blocks have route information including radii of curvature that fall within a predetermined range, from the radius of curvature of the route information included in the block corresponding to the selected partial path. This makes it possible to automatically handle the partial paths (72P) to be changed in their machining state, collectively.

(Second Aspect of the Invention)

The second aspect of the invention resides in the wire electrical discharge machine (10) that includes: the above program editing device (18); the machine main body (14); and the control device (16) configured to control the machine main body (14) based on the machining program.

The program editing device (18) enables change of arc-shaped portions in the machining path (72) for each of the blocks of the machining program. As a result, it is possible to reduce the work man-hour for editing the machining program, compared to a case where plural points are individually designated in the arc-shaped portion.

(Third Aspect of the Invention)

The third aspect of the invention resides in the program editing method for editing the machining program in which the machining path (72) of the wire electrode (12) with respect to the workpiece (W) is specified. The machining program includes the plurality of blocks corresponding to the plurality of the respective divided partial paths (72P) of the machining path (72), and each of the blocks has route information representing the corresponding partial path (72P). The program editing method includes: the display control step (S1) of displaying the machining path (72) on the display unit (54), based on the route information of each of the plurality of blocks; the calculating step (S3) of performing calculation in a manner that, based on an operation of changing a selected one of the partial paths (72P), or the approach point (72A), in the machining path (72) displayed on the display unit (54), the calculating step calculating the change amount (80) of the selected partial path (72P) or the approach point (72A); and the revising step (S4) of revising the block corresponding to the selected partial path (72P) or the approach point (72A), based on the change amount (80).

This configuration enables change of arc-shaped portions in the machining path (72) for each of the blocks of the machining program. As a result, it is possible to reduce the work man-hour for editing the machining program, compared to a case where plural points are designated in the arc-shaped portion.

The revising step (S4) may change the radius of curvature of the route information of the block corresponding to the selected partial path (72P). This makes it possible to change an arc-shaped portion of the machining path (72) directly and facilitate adjustment of the machining state of the arc-shaped portion.

The revising step (S4) adds a compensation amount of a machining condition set in the control device (16) of the wire electrical discharge machine (10) to the route information of the block corresponding to the selected partial path (72P). This makes it possible to change an arc-shaped portion of the machining path (72) indirectly and facilitate fine adjustment of the machining state of the arc-shaped portion.

The present invention is not limited to the embodiments described above, and it goes without saying that the embodiments can be freely modified within a range that does not deviate from the essence and gist of the present invention as set forth in the appended claims.

What is claimed is:

1. A program editing device for editing a machining program in which a machining path of a wire electrode with respect to a workpiece is specified, wherein the machining program includes a plurality of blocks corresponding to a plurality of respective divided partial paths of the machining path, and each of the blocks has route information representing a corresponding partial path,
   the program editing device comprising:
   a display controller configured to display the machining path on a display unit, based on the route information of each of the plurality of blocks;
   a calculation unit configured to perform calculation in a manner that, based on an operation of changing a selected one of the partial paths, or an approach point, in the machining path displayed on the display unit, the calculation unit calculating a change amount of the selected partial path or the approach point; and
   a revising unit configured to revise the block corresponding to the selected partial path or the approach point, based on the change amount.

2. The program editing device according to claim 1, wherein the revising unit is configured to change a radius of curvature of the route information of the block corresponding to the selected partial path.

3. The program editing device according to claim 1, wherein the revising unit is configured to add a compensation amount of a machining condition set in a control device of a wire electrical discharge machine to the route information of the block corresponding to the selected partial path.

4. The program editing device according to claim 1, wherein the revising unit is configured to execute, selectively, a first mode for changing a radius of curvature of the route information of the block or a second mode for adding a compensation amount of a machining condition set in a control device of a wire electrical discharge machine to the route information of the block.

5. The program editing device according to claim 3, wherein:
   the machining condition includes at least one of a feed rate of the wire electrode, a pulse interval between voltage pulses repeatedly applied between the workpiece and the wire electrode and an average voltage applied per unit time; and
   the revising unit is configured to add a compensation amount for compensation of at least one of the feed rate, the pulse interval and the average voltage.

6. The program editing device according to claim 1, further comprising an input unit configured to allow the operation, wherein the input unit includes a touch panel provided on a display screen of the display unit.

7. The program editing device according to claim 1, wherein the display controller is configured to emphasize the selected partial path and change display of the emphasized partial path so as to follow the operation of changing.

8. The program editing device according to claim 1, wherein the display controller is configured to display the change amount calculated by the calculation unit.

9. The program editing device according to claim 1, further comprising an acquisition unit configured to acquire a partial path that is similar to the selected partial path, as a similar partial path, wherein the revising unit is configured to revise the block corresponding to the selected partial path and the block corresponding to the partial path that has been acquired as the similar partial path by the acquisition unit.

10. The program editing device according to claim 9, wherein the acquisition unit is configured to acquire one or more partial paths designated by an operator, as the similar partial paths.

11. The program editing device according to claim 9, wherein the acquisition unit is configured to acquire one or more partial paths as the similar partial paths, whose corresponding blocks have route information including radii of curvature that fall within a predetermined range, from the radius of curvature of the route information included in the block corresponding to the selected partial path.

12. A wire electrical discharge machine, comprising:
   the program editing device according to claim 1;
   a machine main body; and
   a control device configured to control the machine main body based on the machining program.

13. A program editing method for editing a machining program in which a machining path of a wire electrode with respect to a workpiece is specified, wherein the machining program includes a plurality of blocks corresponding to a plurality of respective divided partial paths of the machining path, and each of the blocks has route information representing a corresponding partial path,
   the program editing method comprising:
   displaying the machining path on a display unit, based on the route information of each of the plurality of blocks;
   performing a calculation in a manner that, based on an operation of changing a selected one of the partial paths, or an approach point, in the machining path displayed on the display unit, the performing the calculation including calculating a change amount of the selected partial path or the approach point; and
   revising the block corresponding to the selected partial path or the approach point, based on the change amount.

14. The program editing method according to claim 13, wherein the revising changes the radius of curvature of the route information of the block corresponding to the selected partial path.

15. The program editing method according to claim 13, wherein the revising adds a compensation amount of a machining condition set in a control device of a wire electrical discharge machine to the route information of the block corresponding to the selected partial path.

16. The program editing method according to claim 1, wherein the revising unit is configured to revise the block corresponding to the selected partial path or the approach point, based on the change amount to editing a machining program in which the machining path of the wire electrode with respect to the workpiece is specified.

17. A program editing device comprising:
a memory storing a machining program; and
a processor configured to:
  display a machining path of a wire electrode with respect to a workpiece on a display, based on a route information of each of a plurality of blocks, the plurality of blocks corresponding to a plurality of respective divided partial paths of a machining path, and each of the blocks includes route information representing a corresponding partial path;
  calculate in a manner that, based on an operation of changing a selected one of the partial paths, or an approach point, in the machining path displayed on the display, and calculate a change amount of the selected partial path or the approach point;
  revise the block corresponding to the selected partial path or the approach point, based on the change amount; and
  editing the machining program according to the revision of the block.

18. The program editing device according to claim 17, wherein the processor is configured to revise the block by changing a radius of curvature of the route information of the block corresponding to the selected partial path.

19. The program editing device according to claim 17, wherein the processor is configured to revise the block by adding a compensation amount of a machining condition set in a control device of a wire electrical discharge machine to the route information of the block corresponding to the selected partial path.

20. The program editing device according to claim 17, wherein the processor is configured to revise the block by selectively executing a first mode for changing a radius of curvature of the route information of the block or a second mode for adding a compensation amount of a machining condition set in a control device of a wire electrical discharge machine to the route information of the block.

* * * * *